United States Patent [19]
Asnaashari et al.

[11] Patent Number: 5,564,055
[45] Date of Patent: Oct. 8, 1996

[54] PCMCIA SLOT EXPANDER AND METHOD

[75] Inventors: Mehdi Asnaashari, San Jose; Duc N. Pham, Santa Clara, both of Calif.

[73] Assignee: Lucent Technologies Inc., Murray Hill, N.J.

[21] Appl. No.: 298,240

[22] Filed: Aug. 30, 1994

[51] Int. Cl.⁶ .................................................. G06F 12/00
[52] U.S. Cl. .................. 395/800; 395/829; 364/DIG. 1; 364/245.6; 364/246.3; 364/260.9
[58] Field of Search .................................... 395/700, 800, 395/829, 281–283, 500

[56] References Cited

U.S. PATENT DOCUMENTS

| | | | |
|---|---|---|---|
| 5,183,404 | 2/1993 | Aldous et al. | 439/55 |
| 5,234,351 | 8/1993 | Dixon | 439/160 |
| 5,282,247 | 1/1994 | McLean et al. | 380/4 |
| 5,293,424 | 3/1994 | Holtey et al. | 380/23 |
| 5,295,852 | 3/1994 | Renn et al. | 439/328 |
| 5,334,030 | 8/1994 | Brilliott | 439/75 |
| 5,455,907 | 10/1995 | Hess et al. | 395/162 |
| 5,488,433 | 1/1996 | Washino et al. | 348/722 |
| 5,488,572 | 1/1996 | Belmont | 364/708.1 |
| 5,488,575 | 1/1996 | Danielson et al. | 364/707 |
| 5,495,263 | 2/1996 | Dalton et al. | 345/3 |

FOREIGN PATENT DOCUMENTS

0606111A2  7/1994  European Pat. Off. .

Primary Examiner—Mehmet B. Geckil

[57] ABSTRACT

A PCMCIA slot expander provides a fully functional PCMCIA slot having a 32 MB address space and at least one other resource to a computer or other device having at least one PCMCIA slot. In an illustrated embodiment, a PCMCIA slot is expanded to provide a fully functional PCMCIA slot having a 32 MB address space, an embedded substantially functional PCMCIA slot, first and second serial ports, a parallel port and diagnostic information and access to signals carried on the PCMCIA slot.

8 Claims, 12 Drawing Sheets

FIG. 3C
PCMCIA SLOT

― 108

| Signal | Pin | | Pin | Signal |
|---|---|---|---|---|
| | 1 | J1 | 35 | |
| PCMA_D3 | 2 | | 36 | PCMA_CD1* |
| PCMA_D4 | 3 | | 37 | PCMA_D11 |
| PCMA_D5 | 4 | | 38 | PCMA_D12 |
| PCMA_D6 | 5 | | 39 | PCMA_D13 |
| PCMA_D7 | 6 | | 40 | PCMA_D14 |
| PCMA_CE11* | 7 | | 41 | PCMA_D15 |
| PCMA_A10 | 8 | | 42 | PCMA_CE12* |
| PCMA_OE* | 9 | | 43 | REFRESH |
| PCMA_A11 | 10 | | 44 | PCMA_IORD* |
| PCMA_A9 | 11 | | 45 | PCMA_IOWR* |
| PCMA_A8 | 12 | | 46 | PCMA_A17 |
| PCMA_A13 | 13 | | 47 | PCMA_A18 |
| PCMA_A14 | 14 | | 48 | PCMA_A19 |
| PCMA_WE* | 15 | | 49 | PCMA_A20 |
| PCMA_BSY* | 16 | | 50 | PCMA_A21 |
| PCMA_V5 | 17 | | 51 | PCMA_V5 |
| V12 | 18 | | 52 | V12 |
| PCMA_A16 | 19 | | 53 | PCMA_A22 |
| PCMA_A15 | 20 | | 54 | PCMA_A23 |
| PCMA_A12 | 21 | | 55 | PCMA_A24 |
| PCMA_A7 | 22 | | 56 | PCMA_A25 |
| PCMA_A6 | 23 | | 57 | RESERVED |
| PCMA_A5 | 24 | | 58 | PCMA_RST |
| PCMA_A4 | 25 | | 59 | PCMA_WAIT* |
| PCMA_A3 | 26 | | 60 | RESERVED |
| PCMA_A2 | 27 | | 61 | PCMA_REG* |
| PCMA_A1 | 28 | | 62 | PCMA_BVD2 |
| PCMA_A0 | 29 | | 63 | BVD1 |
| PCMA_D0 | 30 | | 64 | PCMA_D8 |
| PCMA_D1 | 31 | | 65 | PCMA_D9 |
| PCMA_D2 | 32 | | 66 | PCMA_D10 |
| PCMA_WP | 33 | | 67 | PCMA_CD2* |
| | 34 | | 68 | |

PCMCIA-68P

FIG. 3D
EMBEDDED PCMCIA SLOT

| Signal | Pin | | Pin | Signal |
|---|---|---|---|---|
| | 1 | J2 | 35 | |
| PCMA_D3 | 2 | | 36 | |
| PCMA_D4 | 3 | | 37 | PCMA_D11 |
| PCMA_D5 | 4 | | 38 | PCMA_D12 |
| PCMA_D6 | 5 | | 39 | PCMA_D13 |
| PCMA_D7 | 6 | | 40 | PCMA_D14 |
| PCMA_CE21* | 7 | | 41 | PCMA_D15 |
| PCMA_A10 | 8 | | 42 | PCMA_CE22* |
| PCMA_OE* | 9 | | 43 | REFRESH |
| PCMA_A11 | 10 | | 44 | PCMA_IORD* |
| PCMA_A9 | 11 | | 45 | PCMA_IOWR* |
| PCMA_A8 | 12 | | 46 | PCMA_A17 |
| PCMA_A13 | 13 | | 47 | PCMA_A18 |
| PCMA_A14 | 14 | | 48 | PCMA_A19 |
| PCMA_WE* | 15 | | 49 | PCMA_A20 |
| | 16 | | 50 | PCMA_A21 |
| PCMA_V5 | 17 | | 51 | PCMA_V5 |
| V12 | 18 | | 52 | V12 |
| PCMA_A16 | 19 | | 53 | PCMA_A22 |
| PCMA_A15 | 20 | | 54 | PCMA_A23 |
| PCMA_A12 | 21 | | 55 | PCMA_A24 |
| PCMA_A7 | 22 | | 56 | PCMA_A25 |
| PCMA_A6 | 23 | | 57 | RESERVED |
| PCMA_A5 | 24 | | 58 | PCMA_RST |
| PCMA_A4 | 25 | | 59 | |
| PCMA_A3 | 26 | | 60 | RESERVED |
| PCMA_A2 | 27 | | 61 | PCMA_REG* |
| PCMA_A1 | 28 | | 62 | |
| PCMA_A0 | 29 | | 63 | |
| PCMA_D0 | 30 | | 64 | PCMA_D8 |
| PCMA_D1 | 31 | | 65 | PCMA_D9 |
| PCMA_D2 | 32 | | 66 | PCMA_D10 |
| | 33 | | 67 | |
| | 34 | | 68 | |

PCMCIA-68P

110

PCMCIA SLOT EXPANDER AND METHOD

BACKGROUND OF THE INVENTION

The present invention relates in general to personal computers which include slots for receiving integrated circuit (IC) cards compatible with Personal Computer Memory Card International Association (PCMCIA) standards, i.e. PCMCIA slots, and, more particularly, to a method and apparatus for expanding a PCMCIA slot of a personal computer to provide multiple access points to the computer via a PCMCIA slot by allocating the address space available for a PCMCIA compatible IC card to define one or more operable PCMCIA slots, one or more serial and parallel ports, other peripheral or auxiliary devices and various other access and control features for the computer and/or IC cards.

Portable computers and other electronic devices are being reduced in size as advances in technology reduce the size of components used to manufacture these devices. Along with this size reduction, compact slots have been provided in the devices for receiving IC cards. While these slots provide access to a large variety of IC cards which perform a corresponding variety of operations useful for the receiving devices, unfortunately the number of access points more conventionally associated with personal computers, such as serial and parallel ports and expansion slots for receiving other peripheral or auxiliary devices, have typically been eliminated.

In an effort to standardize the IC card formats, the PCMCIA has promulgated various standards governing the physical dimensions and interface configuration of IC cards. These standards are set forth in detail in the *PC Card Standard*, Release 2.0, issued by the PCMCIA, dated September 1991, the disclosure of which is hereby incorporated by reference.

In brief, the PCMCIA standards set forth IC card physical dimensions, electrical interface requirements between IC cards and the devices utilizing the IC cards, and a data format for the interchange of information between IC cards and devices utilizing IC cards. Each PCMCIA IC card is connected to a compatible device through a 68-pin, two piece pin and socket connector with the IC card including the pin portion of the connector. The data format provides for 64 megabytes of address space for use by each IC card.

Computer manufacturers have wholeheartedly endorsed the PCMCIA standards and have included at least one slot for a PCMCIA card in virtually all laptop, subnotebook and notebook computers. In response to the increasing popularity of the PCMCIA standards, numerous PCMCIA compatible devices, such as hard drives, modems, local area network (LAN) adapters and wireless communications systems, have been developed. For example, one communications card which serves the functions of a modem conforming to the PCMCIA standards is manufactured by Intel under the ExCA® trademark. Other similar PCMCIA compatible communications cards are used in local area networks (LAN's).

Another example of a PCMCIA compatible communications card is disclosed in U.S. Pat. No. 5,183,404 issued to Aldous et al. Aldous et al. disclose a PCMCIA compatible communications card for interconnecting a PCMCIA slot of a computer to a conventional RJ-11 plug for interconnecting telephone lines.

While the PCMCIA standards have greatly assisted compatibility between IC cards and using devices, unfortunately the number and types of peripheral or auxiliary devices which may be concurrently connected to using devices is limited since the more conventional access points, such as serial and parallel ports, are typically not provided.

It is thus apparent that a need exists in the art for providing additional access points to laptop, subnotebook and notebook computers, typically limited to one or more PCMCIA slots, without detracting from the compact nature of these computers which has made them very popular to computer users. Ideally, the additional access points would be provided through a PCMCIA slot such that not only new compact computers but also existing compact computers and other devices including a PCMCIA slot would be able to take advantage of the expanded access points.

SUMMARY OF THE INVENTION

This need is met by the method and apparatus of the present invention wherein a PCMCIA slot expander provides a fully functional PCMCIA slot having a 32 MB address space and at least one other resource to a computer or other device having at least one PCMCIA slot. While being generally applicable to PCMCIA slot expansion, a first application in a debug card provides not only a fully functional PCMCIA slot having a 32 MB address space but also an embedded substantially functional PCMCIA slot, first and second serial ports, a parallel port as well as diagnostic information and access to signals carried on the PCMCIA slot.

In accordance with one aspect of the present invention, a slot expander circuit for expanding the resources available through a computer PCMCIA slot including an input connector for receiving the slot expander in place of a PCMCIA integrated circuit card comprises a PCMCIA slot output connector for engaging an input connector of a computer PCMCIA slot. First and second PCMCIA slot input connectors are interconnected to the PCMCIA slot output connector by interface circuitry. The interface circuitry conducts signals between the input connectors and the output connector such that a first PCMCIA compatible integrated circuit card in the first PCMCIA slot input connector and a second PCMCIA compatible integrated circuit card in the second PCMCIA slot input connector can be operated by a computer including an input connector of a PCMCIA slot. The interface circuitry may comprises a programmable array logic circuit.

The slot expander circuit may further comprise at least one serial port, and a peripheral controller connected between the at least one serial port and the PCMCIA slot output connector for engaging an input connector of a computer PCMCIA slot. The peripheral controller is also connected to the programmable array logic circuit. The slot expander circuit may further comprise at least one parallel port, the parallel port being connected to the peripheral controller. To facilitate monitoring of operations performed over the PCMCIA slot, the slot expander may further comprise at least one header connected to the interface circuitry for monitoring the signals received and transmitted by the slot expander circuit. In addition, at least one visual indicator may be connected to the interface circuitry for providing visual monitoring of signals occurring on the interface circuitry.

In accordance with another aspect of the present invention, a slot expander circuit compatible with a PCMCIA slot comprises a first PCMCIA-compatible slot, a second PCMCIA-compatible slot, and interface circuitry connected to the first and second PCMCIA-compatible slots and being capable of removably connecting to the PCMCIA slot for conducting signals between the first and second PCMCIA-compatible slots and the PCMCIA slot. The slot expander circuit may further comprise at least one auxiliary port connected to the interface circuit wherein the interface circuitry controls signals transmitted between the at least one auxiliary port and the PCMCIA slot so that the signals are properly received by the at least one auxiliary port and the PCMCIA slot. The at least one auxiliary port may comprise at least one serial port and/or at least one parallel port.

In accordance with yet another aspect of the present invention, a slot expander circuit for expanding the resources available through a computer PCMCIA slot including a computer input connector for receiving the slot expander in place of a PCMCIA integrated circuit card comprises a PCMCIA slot output connector for engaging an input connector of a computer PCMCIA slot. At least one PCMCIA slot input connector and an auxiliary device input connector are provided. Interface circuitry interconnects the at least one PCMCIA slot input connector and the auxiliary input connector to the PCMCIA slot output connector for conducting signals between the input connectors and the output connector. Accordingly, a corresponding number of PCMCIA compatible integrated circuit cards inserted in the at least one PCMCIA slot input connector and an auxiliary device in the auxiliary device input connector can be operated by a computer including an input connector of a PCMCIA slot.

In accordance with still another aspect of the present invention, a slot expander circuit compatible with a PCMCIA slot comprises a PCMCIA-compatible slot, an auxiliary device slot, and interface circuitry connected to the PCMCIA-compatible slot and the auxiliary device slot and being capable of removably connecting to the PCMCIA slot for conducting signals between the first PCMCIA-compatible slot, the auxiliary device slot and the PCMCIA slot.

In accordance with yet still another aspect of the present invention, a method for expanding a PCMCIA slot having a predetermined address space comprises the steps of: providing at least one PCMCIA-compatible slot; providing at least one auxiliary device; receiving signals from the at least one PCMCIA-compatible slot and the at least one auxiliary device; remapping the address space into at least first and second address regions; allocating the at least one PCMCIA-compatible slot to the first address region; and, allocating the at least one auxiliary device to the second address region. The step of providing at least one auxiliary device may comprise the step of providing at least one auxiliary port. The step of providing at least one auxiliary port may comprise the step of providing at least one serial port or providing at least one parallel port.

It is thus an object of the present invention to expand a PCMCIA slot of a computer or other device to preserve the PCMCIA slot and also provide access to additional devices for the computer including the PCMCIA slot; to expand a PCMCIA slot of a computer or other device to preserve the PCMCIA slot and also provide additional access points such as serial and/or peripheral ports for the computer including the PCMCIA slot; and, to expand a PCMCIA slot of a computer or other device to preserve the PCMCIA slot and also provide additional access points for the computer including the PCMCIA slot by allocating the address space available for the PCMCIA compatible IC card to define one or more operable PCMCIA slots, one or more serial and parallel ports or other peripheral or auxiliary devices.

Other objects and advantages of the invention will be apparent from the following description, the accompanying drawings and the appended claims.

BRIEF DESCRIPTION OF THE DRAWINGS

FIGS. 3A–3E, 4A–4C, 5A and 5B form a schematic diagram implementing the PCMCIA slot expander circuit of FIG. 1. All leads of the circuit elements within a given set of drawing figures having the same base numeral are interconnected within that set of drawings figures unless the leads have a numeral next to them. Leads having a numeral next to them are connected to the portion of the schematic illustrated in the figures having the corresponding base numeral.

DETAILED DESCRIPTION OF THE INVENTION

Figure 1:
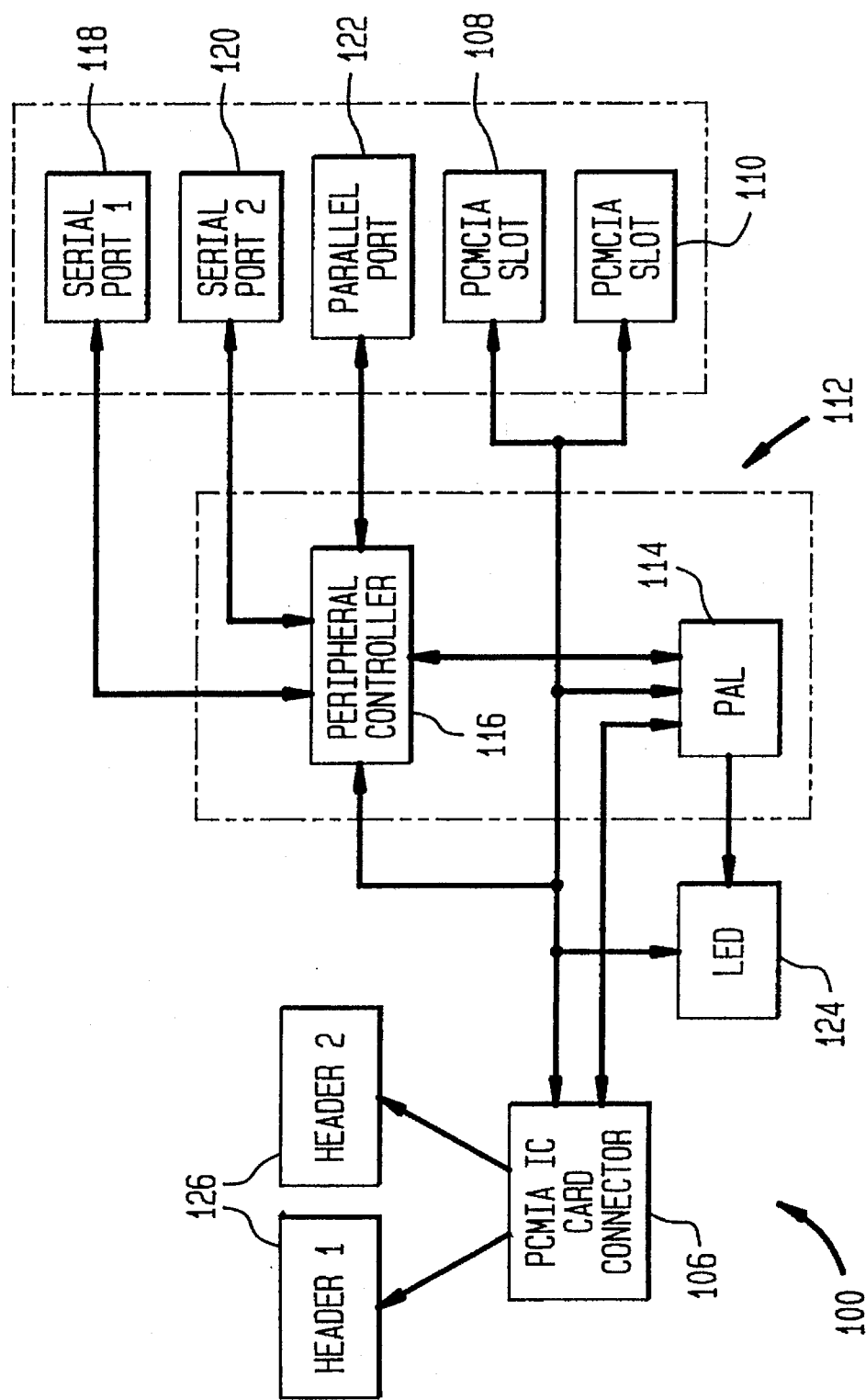
FIG. 1 is a schematic block diagram of an illustrative embodiment of a PCMCIA slot expander circuit operable in accordance with the present invention.

While the present invention is generally applicable to the expansion of PCMCIA slots of computers or other devices to provide multiple access points for the computers or other devices, it will be described herein with reference to a debug card. The debug card is an add-on card that provides assistance in debugging target code and porting operating systems via a PCMCIA slot. The debug card is an initial application of the invention and provides a bidirectional parallel port, two serial ports and diagnostic light emitting diodes. In addition, the debug card provides a first full PCMCIA slot with 32 Megabytes (MB) of address space and a second 16 MB embedded PCMCIA slot. Thus, upon insertion into a PCMCIA slot of a host computer and provision of appropriate drivers in the host computer, the host computer has access to two PCMCIA IC cards, two serial ports and a parallel port via the slot expander circuit of the present application.

The typical PCMCIA controller routes address leads A0 through A25 to the PCMCIA slot thus providing an address space of 64 MB. However, currently available PCMCIA IC cards do not use more than 10 MB to 16 MB of address space. Accordingly, the invention of the present application takes advantage of the address space not currently used by today's PCMCIA IC cards by remapping the space into three separate regions. Region 1 is the lower 32 MB with regions 2 and 3 being 16 MB each below region 1, see FIG. 2A. The first full PCMCIA slot is in region 1 with all the PCMCIA control signals intact such that the first full PCMCIA slot has all the functionality as the original PCMCIA slot but only 32 MB of address space.

The second PCMCIA slot or PCMCIA embedded slot is in region 2 and does not include all of the features of the original PCMCIA slot or the first full PCMCIA slot. For example, the second PCMCIA slot or embedded PCMCIA slot does not include such features as hot insertion.

Region 3 contains a peripheral controller with two serial ports and a bidirectional parallel port. Diagnostic light emitting diodes (LED's) are also included to ease debugging operations performed by the debug card. The debug card also has a set of headers, 2 rows of 2×17, that provide access to the PCMCIA signals. The pinout of the headers matches the PCMCIA connector pinout.

Figure 2:
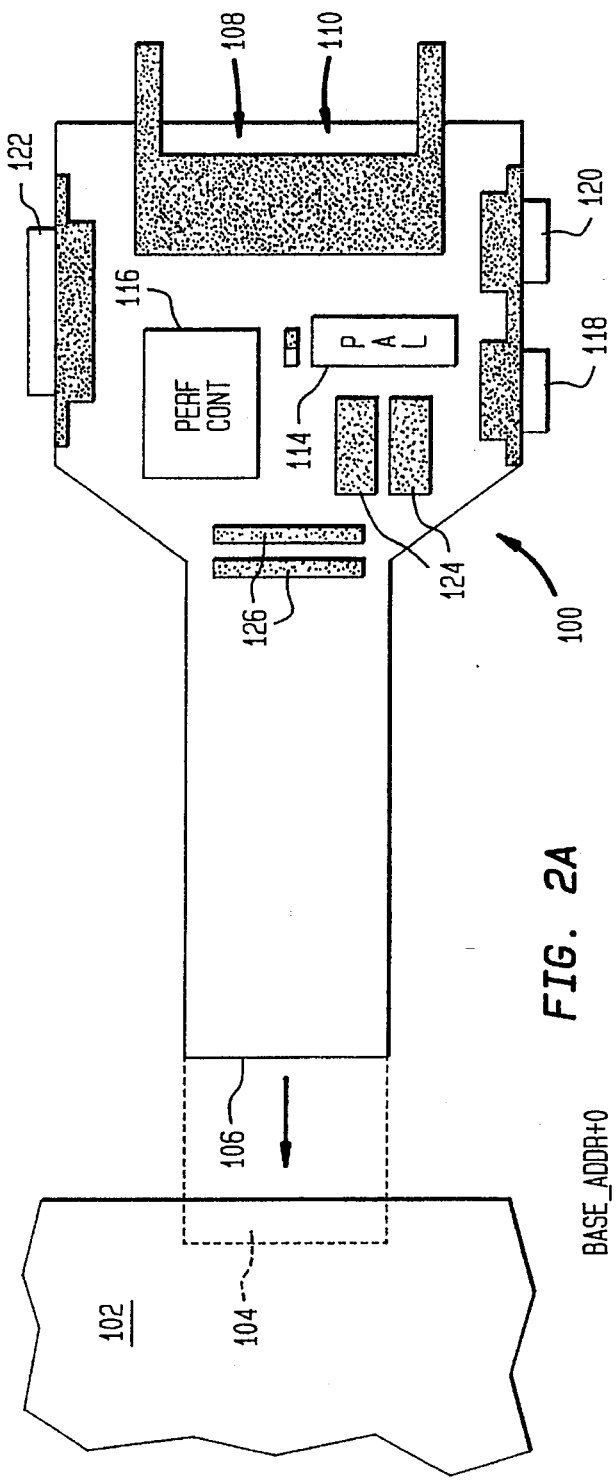
FIG. 2 is a plan view of an equipment or physical layout of the PCMCIA slot expander circuit of FIG. 1.

The slot expander circuit 100 will now be described with reference to the drawings figures wherein FIG. 1 is a schematic block diagram of the slot expander circuit 100 and FIG. 2 is a plan view of an equipment or physical layout of the slot expander circuit 100. As the name implies, the slot expander circuit 100 provides for expanding the resources available through a PCMCIA slot of a computer 102 or other device including an input connector 104 for receiving a PCMCIA IC card. The slot expander circuit is inserted into the input connector 104 in place of a PCMCIA integrated circuit card as generally shown in FIG. 2.

The slot expander circuit 100 includes a PCMCIA slot output connector 106 for engaging the input connector 104 of the PCMCIA slot of the computer 102. A first PCMCIA slot input connector 108 defines the first full PCMCIA slot and is mounted above a second PCMCIA slot input connector 110 which defines the embedded PCMCIA slot. Interface circuitry 112 interconnects the first PCMCIA slot input connector 108 and the second PCMCIA slot input connector 110 to the PCMCIA slot output connector 106 for conducting signals between the input connectors 108, 110 and the output connector 106 such that a first PCMCIA compatible integrated circuit card inserted into the first PCMCIA slot input connector 108 and a second PCMCIA compatible integrated circuit card inserted into the second PCMCIA slot input connector 110 can be operated by the computer 102 including the input connector 104 for a PCMCIA slot.

In the illustrated embodiment, the interface circuitry 112 includes a programmable array logic (PAL) circuit 114 which performs decoding required for defining the 64 MB address space into the regions as defined above. A commercially available 22V10 PAL integrated circuit was used as the PAL circuit 114 in a working embodiment of the present invention. The following pin assignments are made for the 22V10 PAL programmable array logic circuit 114:

The following boolean equations are implemented in the programmable array logic circuit 114 to perform the required decoding:

| | |
|---|---|
| !PCMA_CE11_ = | !PCMA_CE1_ & !PCMA_A25; |
| !PCMA_CE12_ = | !PCMA_CE2_ & !PCMA_A25; |
| !PCMA_CE21_ = | !PCMA_CE1_ & PCMA_A25 & !PCMA_ A24 & !PCMA_ A23; |
| !PCMA_CE22_ = | !PCMA_CE2_ & PCMA_A25 & !PCMA_ A24 & !PCMA_ A23; |
| !PCMA_BVD1 = | (!JUMPER & BVD1) # (JUMPER & (BVD1 # 1RQ_COM1 # IRQ_COM2 # IRQ_LPT)); |
| !LED_CS_ = | !PCMA_CE1_ & PCMA_A25 & PCMA_A24 & !PCMA_A23 & !PCMA_A8; |
| !LPT_CS_ = | (!PCMA_CE1_ # !PCMA_CE2_) & PCMA_A25 & PCMA_A24 & !PCMA_A23 & PCMA_A8; |
| !COM1_CS_ = | (!PCMA_CE1_ # !PCMA_CE2_) & PCMA_A25 & PCMA_A24 & PCMA_A23 & !PCMA_A8; |
| !COM2_CS_ = | (!PCMA_CE1_ # !PCMA_CE2_) & PCMA_A25 & PCMA_A24 & PCMA_A23 & PCMA_A8; and |
| LPT_OE_ = | !PCMA_CE1_ & PCMA_A25 & !PCMA_A24 & PCMA_A23 & PCMA_A8 # !PCMA_A25 & LPT_OE_ # PCMA_A24 & LPT_OE_# !PCMA_A23 & LPT_OE_. |

Wherein & represents the boolean AND function and # represents the boolean OR function. Basically, the PAL circuit 114 looks at the address lines on the PCMCIA slot and passes the signals to the PCMCIA slots associated with the first and second PCMCIA slot input connectors 108, 110, if the address signals are in the appropriate ranges which define region 1 and region 2, respectively. If the address signals are above regions 1 and 2 and hence in region 3, then the control signals are passed to a peripheral controller 116. In a working embodiment of the present invention, the peripheral controller 116 was implemented using a commercially available W86C452 peripheral controller integrated circuit.

As illustrated, the slot expander circuit 100 further defines first and second serial ports 118, 120 and a parallel port 122. The peripheral controller 116 is connected between the first and second serial ports 118, 120 and the parallel port 122 and the PCMCIA slot output connector 106. The peripheral controller 116 is also connected to the programmable array logic circuit 114. To ease debugging operations utilizing the

| | | |
|---|---|---|
| PIN 1 - PCMA_IOWR_ | PIN 9 - BVD1 | PIN 17 - LPT_CS_ |
| PIN 2 - PCMA_A25 | PIN 10 - IRQ_COM1 | PIN 18 - LED_CS_ |
| PIN 3 - PCMA_A24 | PIN 11 - IRQ_COM2 | PIN 19 - PCMA_BVD1 |
| PIN 4 - PCMA_A23 | PIN 12 - GND | PIN 20 - PCMA_CE22_ |
| PIN 5 - PCMA_A8 | PIN 13 - IRQ_LPT | PIN 21 - PCMA_CE21_ |
| PIN 6 - JUMPER | PIN 14 - LPT_OE_ | PIN 22 - PCMA_CE12_ |
| PIN 7 - PCMA_CE1_ | PIN 15 - COM2_CS_ | PIN 23 - PCMA_CE11_ |
| PIN 8 - PCMA_CE2 | PIN 16 - COM1_CS_ | PIN 24 - VCC | slot expander circuit 100, at least one visual indicator is connected to the interface circuitry for providing visual monitoring of signals occurring on the interface circuitry. In the illustrated embodiment, two commercially available TIL311 LED's 124 are provided.

To facilitate debug operations, the slot expander circuit 100 also has a set of headers 126, 2 rows of 2×17, that provide access to the PCMCIA signals for monitoring signals received and transmitted by the slot expander circuit 100. The pinout of the headers matches the PCMCIA connector pinout.

A specific implementation of the slot expander circuit is illustrated in the schematic diagram of FIGS. 3A–3E, 4A–4C, 5A and 5B. The portions of the schematic diagram of 3A–3E, 4A–4C, 5A and 5B which have the same base numeral should be associated together for ease of identifying interconnection of leads within the schematic. That is, the leads within that portion the schematic contained within figures having the same base numeral are interconnected within those figures unless a numeral appears next to the lead. If a numeral appears next to a lead, the numeral corresponds to the drawings figures which show that portion of the schematic to which the lead connects. Thus, if a 3 appears next to a lead, that lead connects to the portion of the schematic illustrated in FIGS. 3A, 3B, 3C, 3D or 3E; if a 4 appears next to a lead, that lead connects to the portion of the schematic illustrated in FIGS. 4A, 4B or 4C; and, if a 5 appears next to a lead, that lead connects to the portion of the schematic illustrated in FIGS. 5A or 5B.

Figure 2A:
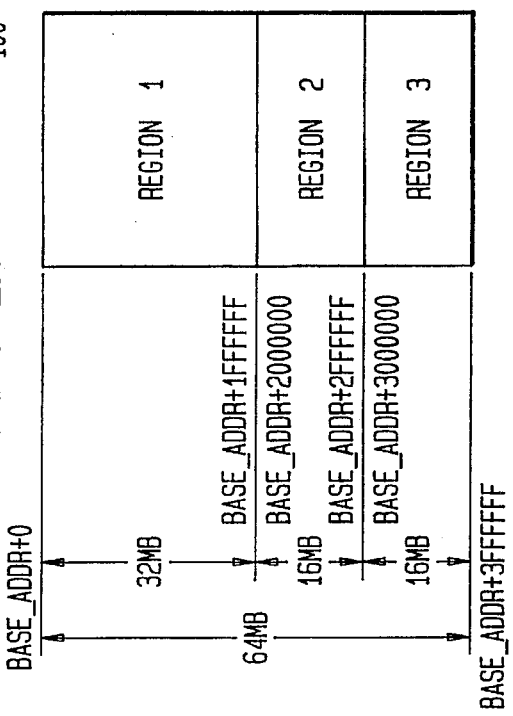
FIG. 2A illustrates address space allocation for the PCMCIA slot expander of FIG. 1.
Figure 3A:
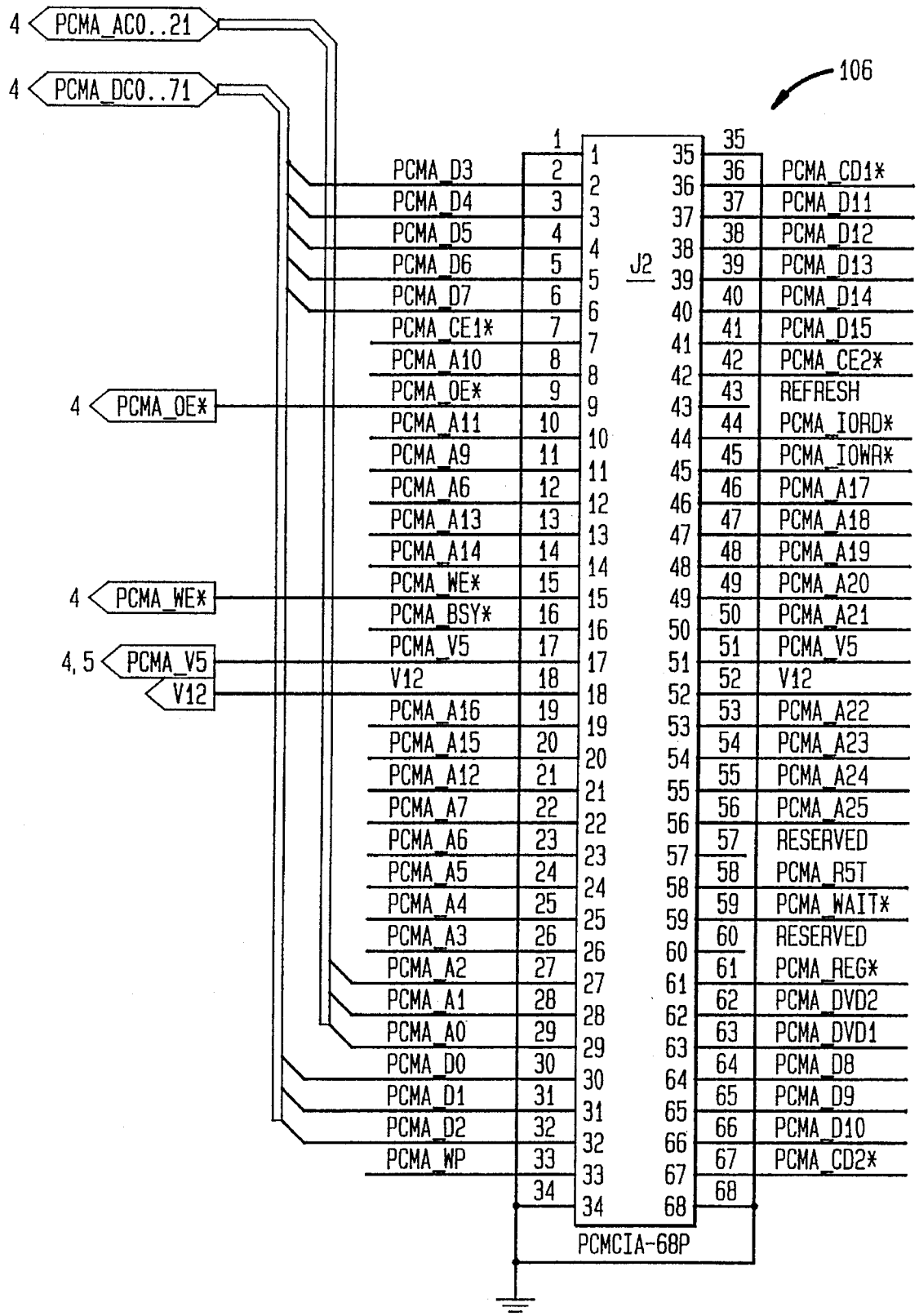
Figure 3B:
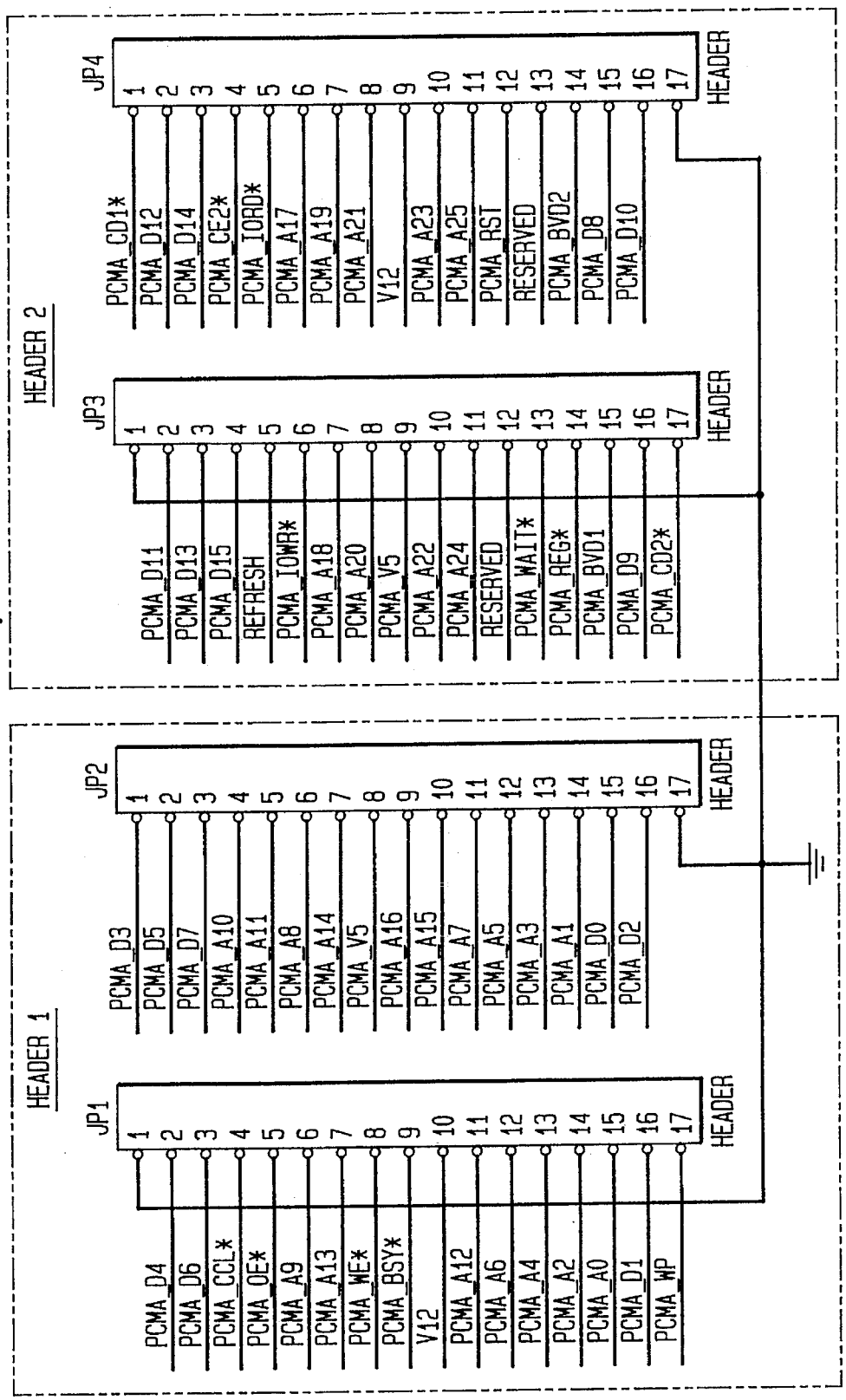
Figure 3E:
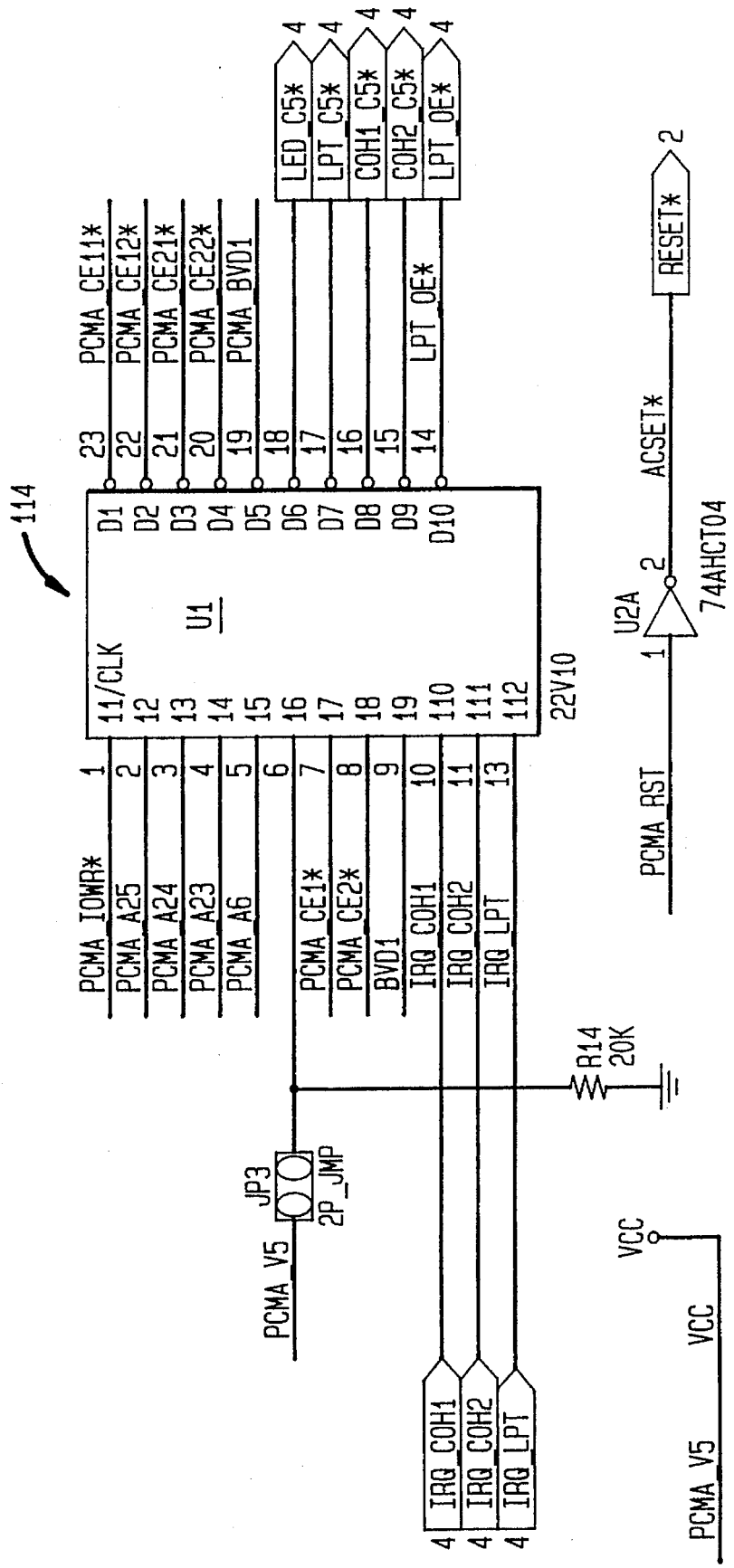
Figure 4A:
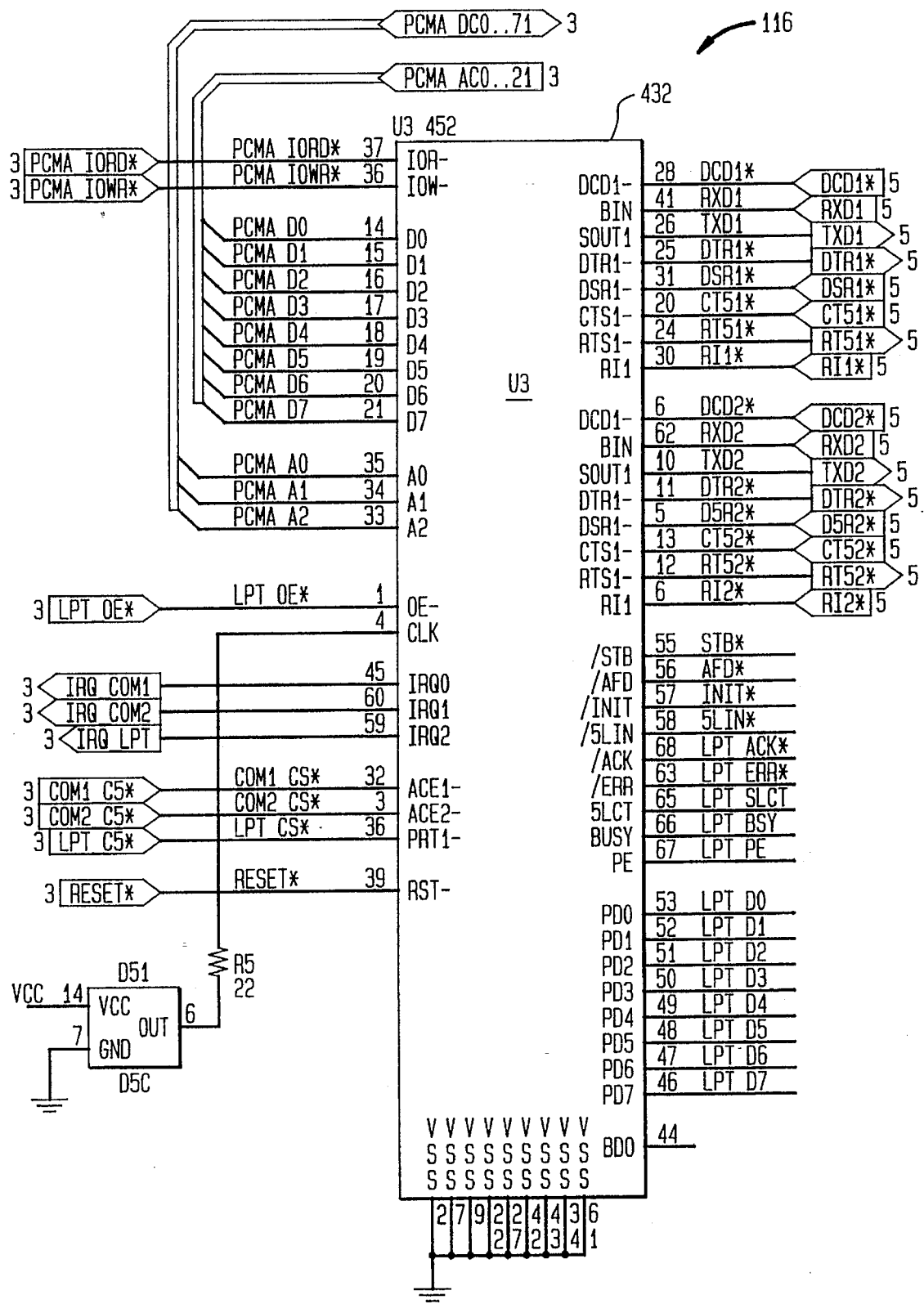
Figure 4B:
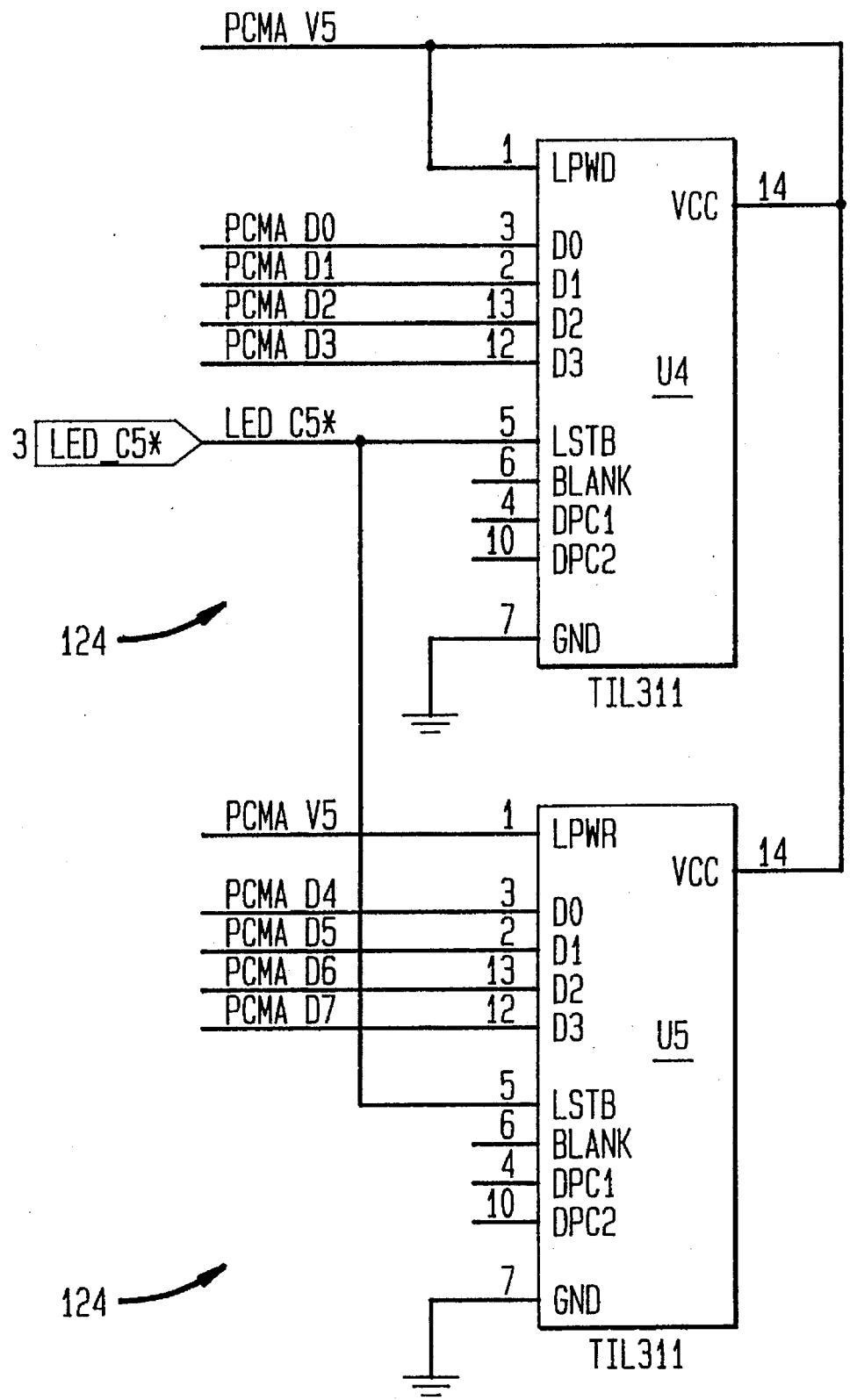
Figure 4C:
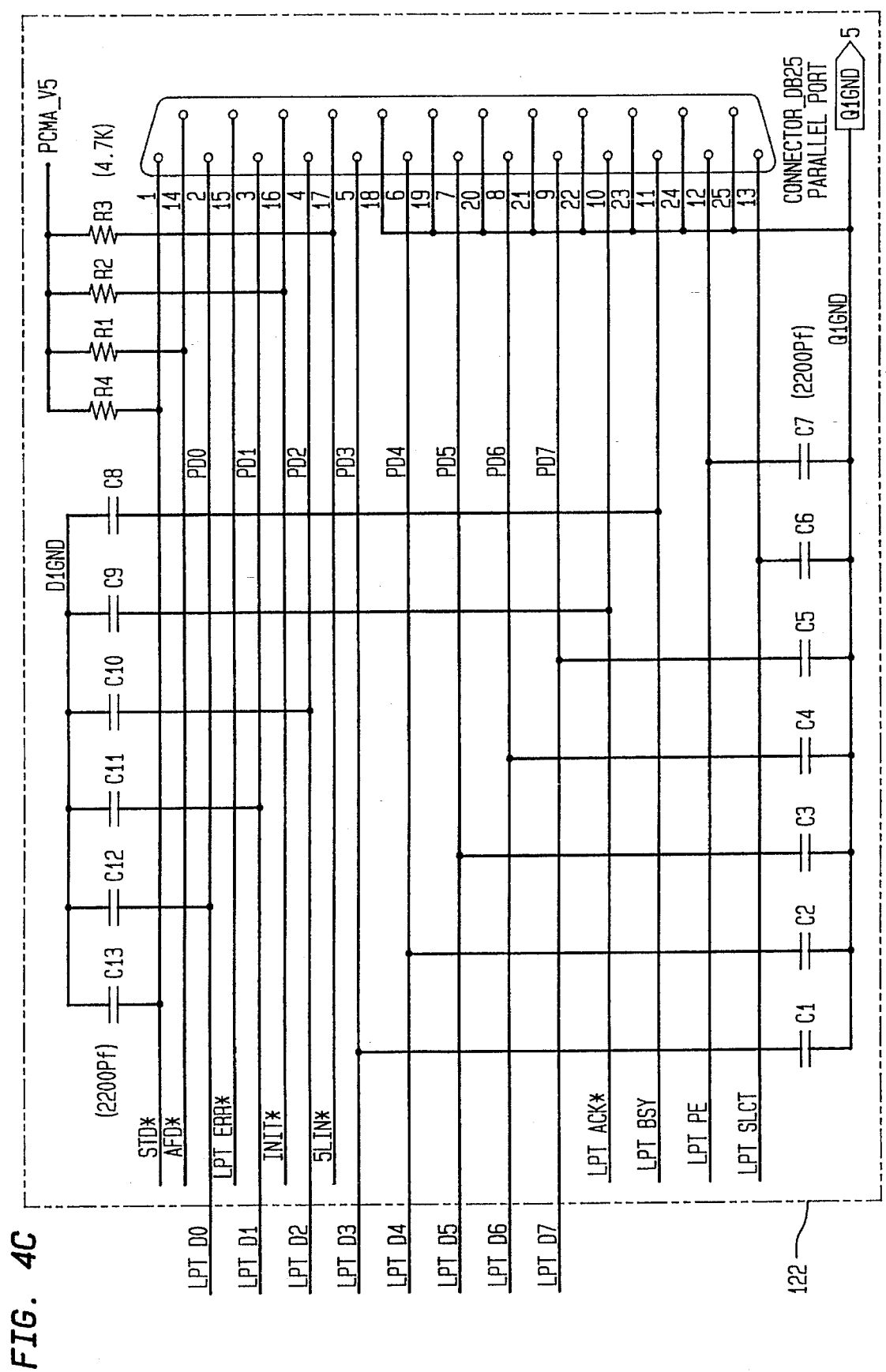
Figure 5A:
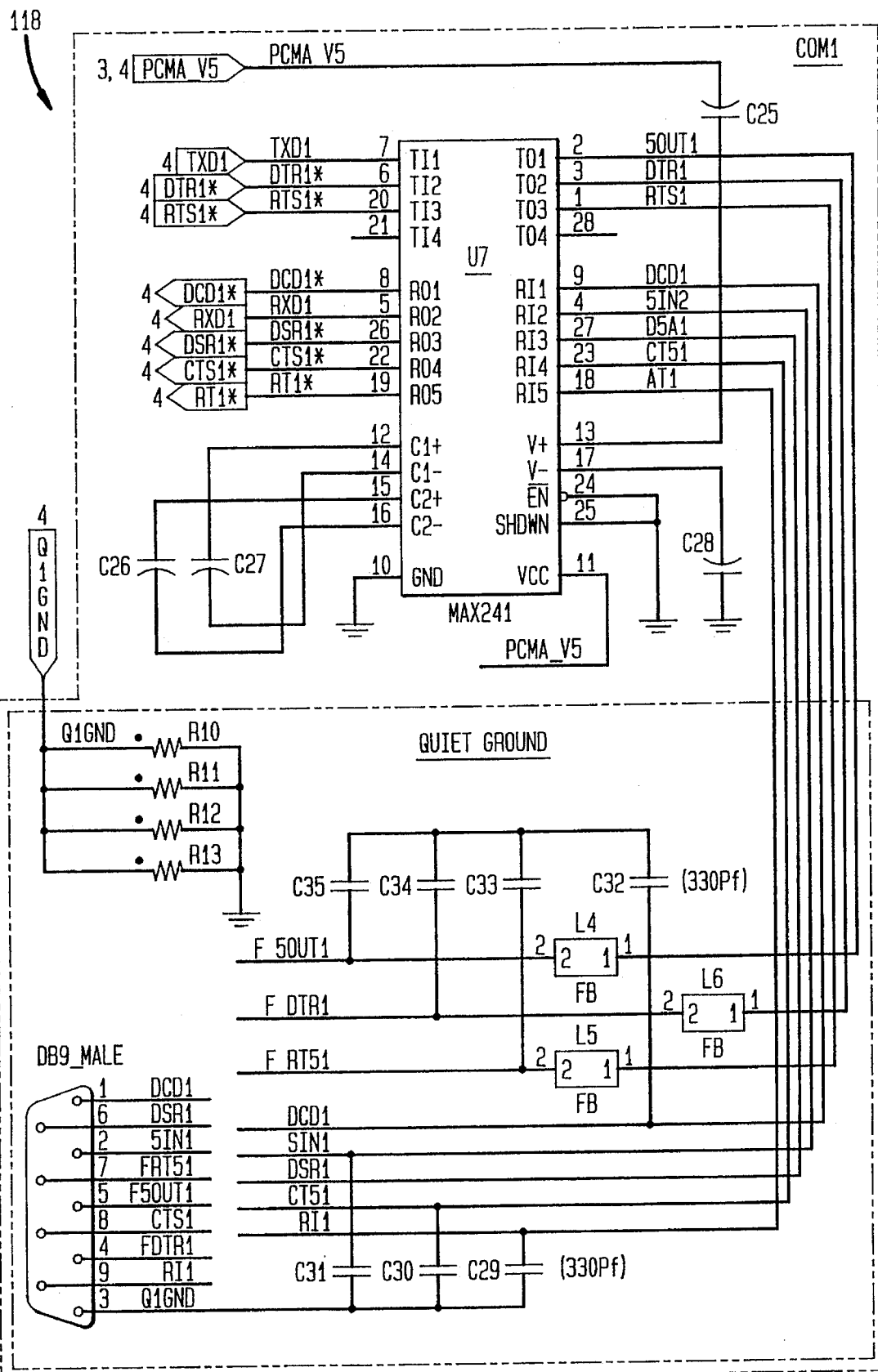
Figure 5B:
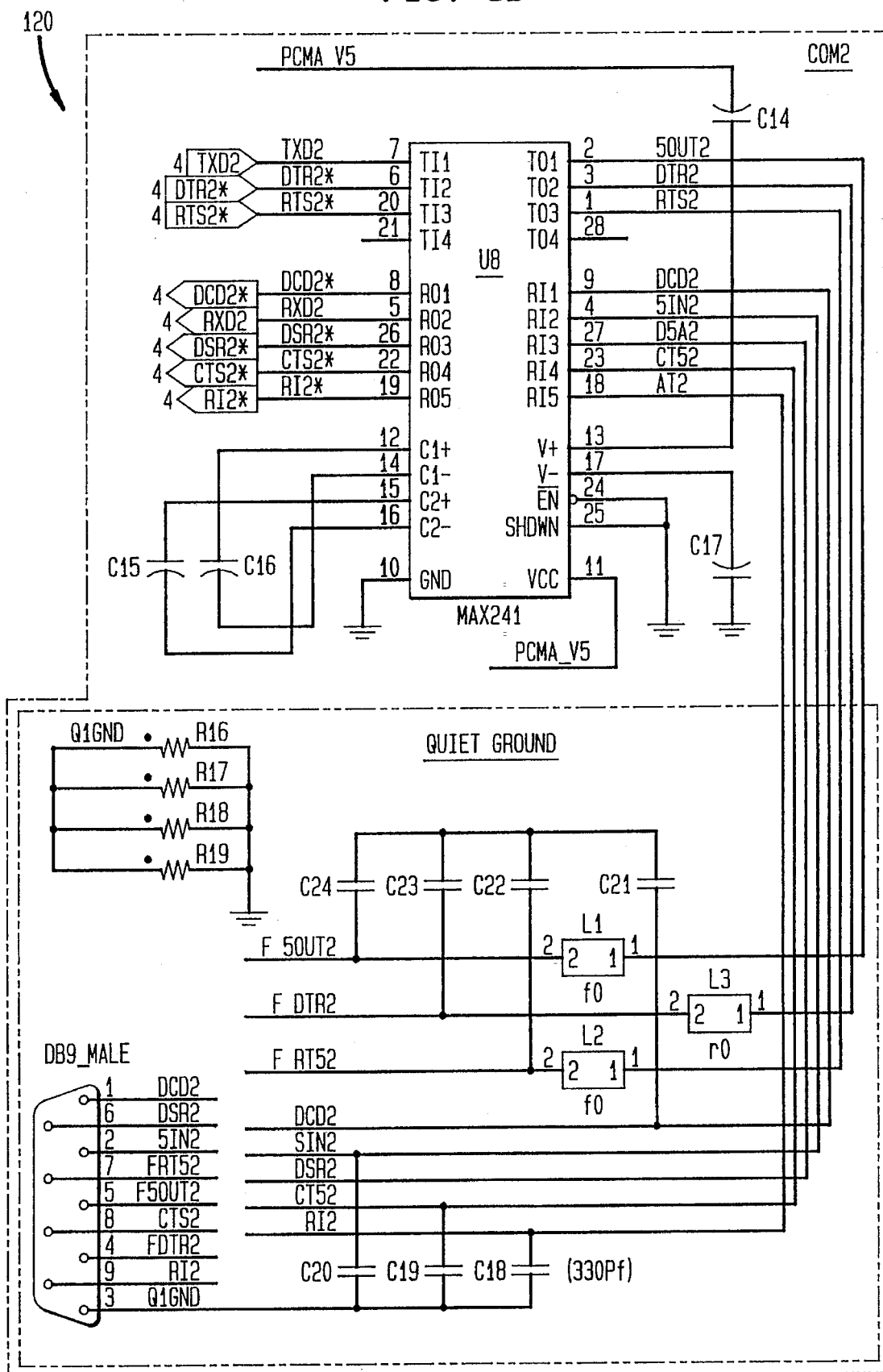

From the forgoing description, it should be apparent that the slot expander circuit 100 provides multiple access points to a computer or other device having one or more PCMCIA slots available for receiving PCMCIA IC cards therein. The host computer or other device must have appropriate device drivers installed therein. Specific device drivers will depend on the particular computer or other device including the PCMCIA slot and can be readily programmed by one skilled in the art of programming device drivers and having the memory map of the computer or other device and the address space layout, for example as shown in FIG. 2A. Accordingly, the device drivers will not be described in detail herein.

With the slot expander 100 installed in the input connector 104 of a PCMCIA slot of the computer 102, the computer 102 has its access expanded from the single illustrated PCMCIA slot to: the fully functional (32 MB) PCMCIA slot corresponding to the first PCMCIA slot input connector 108; the embedded PCMCIA slot (not fully functional, 16 MB) corresponding to the second PCMCIA slot input connector 110; the first and second serial ports 118, 120; and, the parallel port 122. Of course, other types of controllers can be used in place of the peripheral controller 116 to permit access to a desired device and yet preserve the fully functional (32 MB) PCMCIA slot corresponding to the first PCMCIA slot input connector 108 and the embedded PCMCIA slot (not fully functional, 16 MB) corresponding to the second PCMCIA slot input connector 110. Alternately, a controller assigned to 32 MB could be used if it was preferred to only preserve the fully functional (32 MB) PCMCIA slot corresponding to the first PCMCIA slot input connector 108.

While it is believed that the method of expanding a PCMCIA slot in accordance with the present invention is apparent from the forgoing apparatus description, the method will now be briefly described.

In accordance with the present invention, a method for expanding a PCMCIA slot having a predetermined address space comprises the steps of: providing at least one PCMCIA-compatible slot; providing at least one auxiliary device; receiving signals from the at least one PCMCIA-compatible slot and the at least one auxiliary device; remapping the address space into at least first and second address regions; allocating the at least one PCMCIA-compatible slot to the first address region; and, allocating the at least one auxiliary device to the second address region. The step of providing at least one auxiliary device may comprise the step of providing at least one auxiliary port which may be a serial port or a parallel port.

Having thus described the invention of the present application in detail and by reference to preferred embodiments thereof, it will be apparent that modifications and variations are possible without departing from the scope of the invention defined in the appended claims.

What is claimed is:

1. A slot expander for expanding the resources available through a computer PCMCIA slot adapted to receive a PCMCIA integrated circuit card, said slot expander comprising:

a PCMCIA slot expander circuit output connector for engaging an input connector of a computer PCMCIA slot having a given address space;

a first PCMCIA slot expander circuit input connector;

a second PCMCIA slot expander circuit input connector; and interface circuitry interconnecting said first PCMCIA slot expander circuit input connector and said second PCMCIA slot expander circuit input connector to said PCMCIA slot expander circuit output connector for remapping said given address space into at least first and second address regions, for allocating said first PCMCIA slot expander circuit input connector to a first address region and for allocating said second PCMCIA slot expander circuit input connector to a second address region, said interface circuitry conducting signals between said slot expander circuit input connectors and said slot expander circuit output connector such that a first PCMCIA compatible integrated circuit card in said first PCMCIA slot expander circuit input connector is operable within said first address region and a second PCMCIA compatible integrated circuit card in said second PCMCIA slot expander circuit input connector is operable within said second address region by a computer including an input connector of a PCMCIA slot which receives said PCMCIA slot expander circuit output connector.

2. A slot expander as claimed in claim 1 wherein said interface circuitry comprises a programmable array logic circuit.

3. A slot expander as claimed in claim 2 wherein said interface circuitry provides for remapping said given address space into said first address region, said second address region and a third address region, said slot expander further comprising:

at least one serial port; and a peripheral controller connected between said at least one serial port and said PCMCIA slot expander circuit output connector for engaging an input connector of a computer PCMCIA slot, said peripheral controller also being connected to said programmable array logic circuit and said at least one serial port being operable within said third address region by said computer.

4. A slot expander as claimed in claim 3 further comprising at least one parallel port, said at least one parallel port being connected to said peripheral controller and being operable within said third address region by said computer.

5. A slot expander as claimed in claim 4 further comprising at least one header connected to said interface circuitry for monitoring the signals received and transmitted by the slot expander.

6. A slot expander as claimed in claim 5 further comprising at least one visual indicator connected to said interface circuitry for providing visual monitoring of signals occurring on said interface circuitry.

7. A slot expander for expanding the resources available through a computer PCMCIA slot including a computer input connector for receiving said slot expander in place of a PCMCIA integrated circuit card, said computer PCMCIA slot having a given address space and said slot expander comprising:

a PCMCIA slot expander circuit output connector for engaging an input connector of said computer PCMCIA slot;

at least one PCMCIA slot expander circuit input connector;

an auxiliary device input connector; and interface circuitry interconnecting said at least one PCMCIA slot expander circuit input connector and said auxiliary input connector to said PCMCIA slot expander circuit output connector for remapping said given address space into address regions corresponding to said at least one PCMCIA slot expander circuit input connector and said auxiliary device input connector, for allocating said at least one PCMCIA slot expander circuit input connector to a corresponding at least one address region and for allocating said auxiliary device to a corresponding address region, said interface circuitry conducting signals between said PCMCIA slot expander circuit input connectors and said PCMCIA slot expander circuit output connector such that a corresponding number of PCMCIA compatible integrated circuit cards inserted in said at least one PCMCIA slot expander circuit input connector and an auxiliary device in said auxiliary device input connector is operable within their corresponding allocated address regions by a computer including an input connector of a PCMCIA slot.

8. A slot expander compatible with a computer PCMCIA slot having a given address space, said slot expander comprising:

a slot expander circuit PCMCIA-compatible slot;

an auxiliary device slot; and interface circuitry connected to said slot expander circuit PCMCIA-compatible slot and said auxiliary device slot and being capable of removably connecting to the computer PCMCIA slot for remapping said given address space into first and second address regions, for allocating said slot expander circuit PCMCIA-compatible slot to said first address region and for allocating said auxiliary device to said second address region, said interface circuitry conducting signals between said first slot expander circuit PCMCIA-compatible slot, said auxiliary device slot and the computer PCMCIA slot so that said slot expander circuit PCMCIA-compatible slot is operable within said first address region and said auxiliary device is operable within said second address region.

* * * * *